United States Patent [19]

Hansen et al.

[11] 4,125,588

[45] Nov. 14, 1978

[54] NICKEL AND MAGNESIA RECOVERY FROM LATERITES BY LOW TEMPERATURE SELF-SULFATION

[75] Inventors: Barry J. Hansen, Hibbing; James C. Stensrud, Grand Rapids; Adolfo R. Zambrano; Dennis D. Chilcote, both of Hibbing, all of Minn.

[73] Assignee: The Hanna Mining Company, Cleveland, Ohio

[21] Appl. No.: 820,846

[22] Filed: Aug. 1, 1977

[51] Int. Cl.$^2$ .................... C01G 53/10; C01G 49/14; C01F 5/40
[52] U.S. Cl. .................... 423/150; 423/155; 75/115; 75/119; 75/121
[58] Field of Search ............. 423/150, 155, 544, 554, 423/558, 147; 75/101 R, 115, 119, 121

[56] References Cited

U.S. PATENT DOCUMENTS

| | | | |
|---|---|---|---|
| 1,091,545 | 3/1914 | Sulman et al. | 423/147 |
| 3,480,386 | 11/1969 | McMahon | 75/115 |
| 3,868,440 | 2/1975 | Lindblad | 75/115 |

*Primary Examiner*—Brian Hearn

*Attorney, Agent, or Firm*—Maky, Renner, Otto & Boisselle

[57] ABSTRACT

A process for recovering iron, nickel and magnesium metal from low grade nickeliferrous ores is described. This process which requires little energy input comprises the steps of (a) grinding the ore to reduce the particle size of the ore, (b) preparing a slurry of the ground ore in sulfuric acid containing less than ten percent of water, (c) adding water to the acid:ore slurry in an amount which is effective to initiate a sulfation reaction, (d) allowing the sulfation reaction to continue utilizing the heat of the sulfation reaction, whereby water-soluble metal sulfates are formed, (e) leaching the sulfation product with water to extract the water-soluble salts of iron, nickel and magnesium from the insoluble residue, and (f) recovering the nickel, magnesium and iron from the leach solution.

The desired metals which are recovered in this manner contain significantly reduced levels of undesirable silica.

9 Claims, 1 Drawing Figure

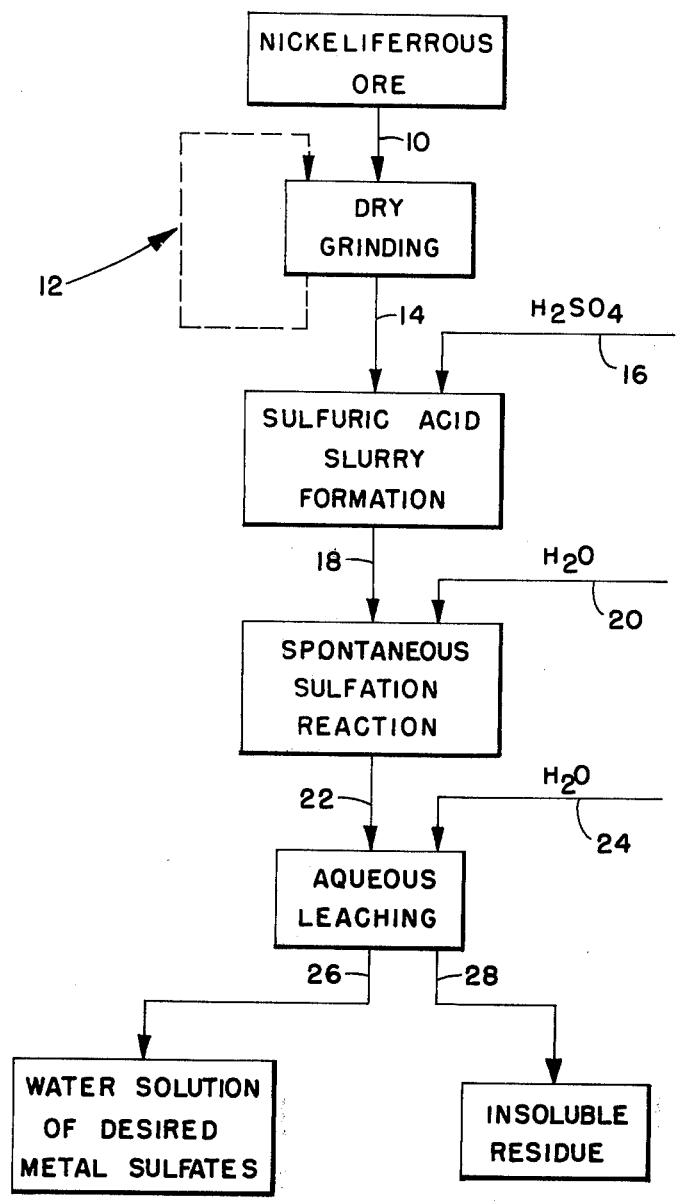

NICKEL AND MAGNESIA RECOVERY FROM LATERITES BY LOW TEMPERATURE SELF-SULFATION

BACKGROUND OF THE INVENTION

The present invention relates to a hydrometallurgical process for treating nickeliferrous ores and more particularly, to a method of treating low grade nickeliferrous lateritic ores containing large amounts of silica and magnesia and small amounts of nickel to recover iron, nickel and magnesium containing significantly reduced amounts of silica.

The laterite ores which are processed in accordance with the method of this invention are oxidic complexes containing small amounts of nickel and cobalt while containing large amounts of iron and substantially larger amounts of magnesia and silica. The Riddle Oregon nickel laterite ore deposits are illustrative, and a typical Riddle nickel laterite ore, after dryng, analyzes by weight about 0.7% nickel, 0.04% cobalt, 0.5% chromium, 6.5% iron, 36% magnesia, 48% silica and 6% loss on ignition. The amounts of these components will vary somewhat depending on the source of the ore and any preliminary beneficiation treatment.

The nickel values in nickeliferrous oxide ores, such as laterites, are highly dispersed throughout the ore and are present as complex hydrated silicate minerals of varying chemical compositions. Because the nickel values generally are not present as a separate and distinct phase, the ore cannot be beneficiated to produce a concentrate which is rich in nickel.

Laterite ores containing nickel have been treated pyrometallurgically to recover ferronickel, or pyrometallurgically in conjunction with vapometallurgical techniques to recover nickel as nickel carbonyl. These methods are suitable for ores containing above 2% nickel, but the processes are not entirely satisfactory because large amounts of fuel and energy are consumed in heating the mass of the ore which is predominately gangue.

A number of proposals have been made in the prior art for the extraction of nickel from laterite nickel ores which involved direct acid leaching of the raw ore, sulfating, chloridizing, and, after preliminary reduction, leaching with acid or ammoniacal solutions or extraction with carbon monoxide. Most of these proposals are costly, and do not result in an acceptable high recovery of nickel.

Previous proposals for direct acid leaching of the raw ore to extract desirable metal values such as nickel, iron and magnesium, have involved one or more baking operations at elevated temperatures thereby requiring large amounts of fuel and energy. Moreover, some of these techniques proved unsatisfactory for treating laterite ores containing large amounts of silica since the leachng techniques were not successful in separating the silica from the desired metals.

It also has been suggested to selectively reduce nickel-bearing lateritic ores and then to leach selectively reduced nickel values therefrom. Ammonia and acids have been suggested as leaching agents depending on the nature of the ore. The difficulty with this proposed technique is that the selective reduction must be conducted, to insure that the nickel values are reduced and to insure that the magnesia contents are rendered less soluble. Recovery of nickel values using ammonia leaching is not as good as desirable. Acid leaching results in higher nickel recoveries but large amounts of acid are required which results in greater amounts of dissolved silica and formation of silica gel resulting in handling problems.

One example of the prior art technique utilizing a dilute aqueous solution of sulfuric acid followed by baking at an elevated temperature to form extractable sulfates, and finally leaching to extract the desired metals is found in U.S. Pat. No. 3,899,300. A variation in this technique is described in U.S. Pat. No. 3,244,513, where the ore is sulfated with sulfuric acid and heated at a temperature of between 500° and 725° C prior to leaching. These patents are illustrative of the commonly described baking processes which require high capital investment, significant amounts of energy input and several hours for completion.

U.S. Pat. No. 3,868,440 describes a hydrometallurgical process for treating slag materials, especially copper smelter slag material to extract copper as copper sulfate while leaving most of the silica in the slag as insoluble silicious residue. This procedure involves mixng the ground-up slag with concentrated sulfuric acid to form an acid-slag mixture, adding a unit part by weight of water, and allowing the mixture to react to produce a dry solid material in which the metal values are converted to a water-soluble form which is readily separable from the insoluble silica material. The aging of the acid-slag mixture requires at least several hours and preferably from about 8 to 30 hours. U.S. Pat. No. 3,868,440 also discloses that satisfactory results also can be obtained when the acid is added to wet slag, and that this procedure is desirable in processing of water-ground slag.

There still remains, however, a need for a low-cost, low-energy process for extracting nickel and magnesium from nickeliferrous ores which will provide nickel and magnesium values in quantity and of satisfactory purity.

SUMMARY OF THE INVENTION

The present invention provides an improved low-cost and low-energy hydrometallurgical process for recovering nickel and magnesium values from nickeliferrous ores containing small amounts of nickel. The process of this invention utilizes the exothermic character of the reaction to provide much of the energy required, and the process results in the recovery of nickel and magnesium containing significantly reduced amounts of impurities such as silica. The process of the invention comprises the steps of (a) grinding the ore to reduce the particle size of the ore, (b) preparing a slurry of the ground ore in sulfuric acid containing less than ten percent of water, (c) adding water to the acid:ore slurry in an amount which is effective to initiate a sulfation reaction, (d) allowing the sulfation reaction to continue utilizing the heat of the sulfation reaction, whereby water-soluble metal sulfates are formed, (e) leaching the sulfation product with water to extract the water-soluble salts of iron, nickel and magnesium from the insoluble residue, and (f) recovering the nickel, magnesium and iron from the leach solution.

In addition to requiring little energy, the process of the invention is rapid. Process steps (b) through (d) can be effected in a matter of minutes, for example, 10-20 minutes being more than sufficient to conduct these three steps and complete the sulfation reaction. High recoveries of iron, nickel and magnesia containing significantly reduced amounts of silica are obtained.

BRIEF DESCRIPTION OF THE DRAWING

The FIGURE is a flow diagram showing one modification of the operation of the process of this invention.

DESCRIPTION OF THE PREFERRED EMBODIMENTS

The nickel-containing ores which are treated in accordance with the method of this invention are nickeliferrous or lateritic ores which contain nickel, iron, magnesium, and silica. These nickeliferrous ores will contain, depending on the source, from about 0.5 to 2 or even up to 3% of nickel, and over 30% magnesia. It is desirable to recover the nickel, magnesium and iron with reduced amounts of silica impurities.

The process for treating such ores containing nickel, iron and magnesium to recover said metals with reduced levels of silica contamination involves a simplified procedure which can be conducted with readily available equipment utilizing a minimum of energy.

The method of the invention is illustrated in the drawing. The nickel and iron-containing ore which is to be treated in accordance with the process of the invention is advanced to a grinder as indicated by arrow 10 for grinding the ore to reduce the particle size of the ore. Because the natural ores recovered from the ground are wet, the ore generally will be dried prior to grinding to reduce the moisture content. The desired particle size is one which provides for ease of handling and for obtaining maximum surface contact with the sulfuric acid in subsequent steps. The desired particle size range may be different depending on the type and source of the ore, and the optimum sizes can be determined readily by one skilled in the art. The grinding may be by any mechanical means to form powdered material which for the Riddle ores has been found to be preferably in the range of −65 to −100 mesh. Smaller particle sizes will allows for greater surface area and increased surface contact between the particles and the sulfuric acid and, therefore, will favor rapid chemical reactions. Particles obtained from the grinder which are larger than desired can be returned to the grinder as indicated by arrow 12. Because it is desired to exclude water and moisture as much as possible and to obtain a dry powder, dry grinding techniques are utilized for preparing the powdered ore.

The ground ore is advanced as indicated by arrow 14 to equipment for preparing a sulfuric acid slurry. Concentrated sulfuric acid containing less than 10% (and preferably less than 5%) of water is added to the ore as indicated by arrow 16, and an acid-ore slurry is prepared. The ore used to form the slurry should contain no more than 1% of moisture and preferably less than 0.5% of moisture. The ratio of sulfuric acid to ore in the slurry may vary but it is preferred that for most ores the weight ratio of sulfuric acid to ore be within the range of from about 1:1 to about 1.1:1. Since the function of the acid is to form sulfates preferably of the desirable metals nickel, iron and magnesium, the amount of sulfuric acid used will depend on the relative amounts of these metals present in the ore. For example, less sulfuric acid should be used with an ore which is high in silica but low in magnesium, nickel and iron than for an ore containing larger amounts of the desirable metals. Additional excesses of acid add to the cost and are unnecessary. The sulfuric acid and ore are mixed to ensure formation of a homogeneous slurry. In the absence of significant amounts of moisture, the sulfation reaction can be avoided during the slurry formation.

It is important that thorough mixing of the ore and acid be obtained. Thus, helocoidal type of impellers are preferred, and the mixing equipment for preparing the slurry may be water cooled to maintain the acid-ore slurry at a temperature below which the sulfation reaction could otherwise be initiated.

After the acid-ore slurry is prepared, the sulfation reaction is initiated when the slurry is advanced to the appropriate equipment as indicated by arrow 18 whereupon water is added as indicated by arrow 20 to initiate a spontaneous sulfation reaction. The amount of water which is added to the acid-ore slurry may be varied but if too much water is added, the heat losses increase thereby diminishing some of the advantages of the method of the invention. Accordingly, an amount of water within the range of from about 3% to about 30% or 40% by weight based on the weight of the ore can be utilized. From about 10% to about 15% by weight appears to be an optimum amount of water. If too little water is added, the sulfation reaction does not proceed at a rate which is sufficient to raise the temperature of the mixture to a level which is sufficient to complete the sulfation reaction within a reasonable time and/or an excessively dry residue containing unreacted ore may result.

The spontaneous exothermic sulfation reaction is allowed to continue by utilizing the heat of the sulfation reaction, and no external source of heat is required. Under the conditions of the method of this invention, the sulfuric acid and water mixture attacks the minerals in the ore, especially the iron, nickel and magnesium minerals forming water-soluble metal sulfates in an extremely rapid exothermic chemical reaction which is completed in less than 10–20 minutes, generally in less than 5 minutes and often in less than 3 minutes. The time required for the sulfation reaction will depend on a number of easily determined parameters such as the nature of ore, particle size distribution of the ore, temperature of the reaction mixture and degree of agitation. The major portion of the silica in the ore is not converted into a soluble form.

The spontaneous sulfation reaction is conducted in an acid-resistant conveyor belt where the sulfation reaction is allowed to proceed and is self-sustained at a temperature of 150°–210° C. When the acid-ore-water mixture is properly handled, an optimum temperature of 200° C is reached which results in higher metal extractions. In the range of 150°–210° C, the sulfation reaction mixture is retained on the belt for about 1 to 10 minutes. Higher extractions of the soluble sulfates of Fe, Ni, and Mg are obtained by allowing the sulfation reaction mixture to age in, for example, a storage bin before leaching.

Alternatively, the acid-ore slurry and the water can be added to a pug mill where slow stirring is provided by necessity during the sulfation reaction to discharge the product.

The product which is formed as a result of the spontaneous sulfation reaction when the weight ratio of acid:ore is within the range of about 1:1 to about 1.1:1 and the amount of water added is within the range of from about 3% to about 35% based on the weight of the ore in the mixture, generally is dry and powdery which facilitates the handling and storage of the product.

The desired iron, nickel and magnesium metal values which are contained in the reaction product as water soluble sulfates are easily leached with water in any suitable vessel. The reaction product is advanced to a leaching vessel as shown by arrow 22 where leaching water is added as shown by arrow 24. The amount of water used for leaching may vary over a wide range and is not critical except that the use of large amounts of water increases the energy required for recovery of the metals and may present a disposal problem. Generally, the ratio of leach water to sulfated product will be within the range of from about 1:1 to about 2:1. Leaching time can vary over a wide range depending upon the fineness of the powdered product, the degree of agitation and the temperature of the leach water. Water temperatures of between room temperature to about 70° or 80° C. have been found to be satisfactory, and leaching at these temperatures generally is completed in less than about 15 to 20 minutes. Higher temperatures may be utilized but have not been found necessary to provide high recoveries of the desired metal values.

Upon completion of the leaching, the water solution of the desired metal sulfates is separated from the insoluble residue as indicated by arrows 26 and 28 by procedures known in the art. It has been found that the separation can be effected readily by conventional settling and decantation, or by filtration. The solid residue is predominantly silicious material and is discarded. The soluble metal values contained in the water solution can be recovered by known processes.

The following examples illustrate the method of the present invention and the high yield of desired metal values recovered. Unless otherwise indicated, all parts and percentages are by weight.

EXAMPLE 1

About 2,000 lbs. of Riddle lateritic nickel ore rejects containing less than 1% moisture are dry-ground to a particle size range of about −65 to about −100 mesh. The ground ore is mixed with about 2200 lbs. of concentrated sulfuric acid (96% grade) in a mixing cell equipped with a helocoidal type of impeller. The acid-ore slurry is added to a pug mill whereupon sufficient water is added to the pug mill while stirring at a rate of about 16 rpm to provide a moisture content of about 30% by weight based on the weight of the ore in the pug mill. The addition of the water triggers the sulfation reaction, and the temperature of the mixture rises to about 150°–200° C. Self-sulfation of the mixture occurs by utilization of the heat of the reaction, and the reaction substantially is completed in about 5 minutes.

About 100 grams of the sulfated product is leached with 200 grams of water at room temperature for a period of about 15 minutes, and the mixture is filtered. The residue and the filtrate are assayed, and the results are recorded in the following Table I. These results demonstrate the effectiveness of the method of the invention for recovering high yields of the desired iron, nickel, and magnesium value while significantly reducing the silica contaminates.

TABLE 1

|  | Fe | Ni | Mg | $SiO_2$ |
|---|---|---|---|---|
| Residue (%) | 0.8 | 0.046 | 4.47 | 66.96 |
| Filtrate (g/l) | 8.21 | 1.02 | 30.5 | 0.089 |
| Extraction (%) | 92.0 | 96.1 | 88.5 | 0.15 |

EXAMPLE 2

The procedure of Example 1 is repeated except that the amount of water added to trigger the sulfation reaction is reduced to 25% by weight based on the weight of the ore. The results of the assay of the residue and filtrate obtained in this example are summarized in Table II.

TABLE II

|  | Fe | Ni | Mg | $SiO_2$ |
|---|---|---|---|---|
| Residue (%) | 0.83 | 0.048 | 5.27 | 70.1 |
| Filtrate (g/l) | 8.27 | 1.02 | 30.1 | 0.102 |
| Extraction (%) | 92.0 | 96.1 | 86.9 | 0.17 |

EXAMPLE 3

In this example, a lean Riddle lateritic nickel ore containing about 0.7% of nickel, 6.5% of iron, 36% of magnesia, 48% of silica, and less than 1% of water is treated with 96% sulfuric acid in a weight ratio of about 1:1.1 to form an acid-ore slurry. The slurry is advanced to an acid-resistant conveyor belt where water is added to the slurry to provide a water content of about 10% based on the weight of the ore. The addition of the water triggers a spontaneous exothermic sulfation reaction on the conveyor belt which is self-sustained at a temperature of about 150°–210° C. The reaction is completed in about 5 minutes, and the powdery product is removed from the conveyor belt and stored. A sample (100 grams) of the sulfated ore is leached with about 100 grams of water at a temperature of 70° C. for about 15 minutes. The leaching solution is separated from the insoluble residue by filtration. The filtrate and residue are analyzed and the results of the analysis are summarized in Table III.

TABLE III

|  | Fe | Ni | Mg | $SiO_2$ |
|---|---|---|---|---|
| Residue (%) | 1.57 | 0.05 | 4.16 | 70.66 |
| Filtrate (g/l) | 6.95 | 0.85 | 15.61 | 0.05 |
| Extraction (%) | 90.6 | 97.5 | 87.3 | 0.15 |

The results obtained from the above examples illustrate the desirable results obtained by the method of this invention which requires a minimum of materials and energy input. The desirable purity and high recovery of iron, nickel and magnesium are obtained without the high energy baking procedures required by prior art techniques.

EXAMPLE 4

The procedure of Example 3 is repeated except that a sample of the sulfated ore from the belt conveyor is leached with water in an amount which provides a water-to-sulfated ore ratio of 2. The filtrate and residue are analyzed and the results are summarized in Table IV.

TABLE IV

|  | Fe | Ni | Mg | $SiO_2$ |
|---|---|---|---|---|
| Residue (%) | 1.51 | 0.06 | 4.66 | 71.22 |
| Filtrate (g/l) | 6.97 | 0.85 | 15.43 | 0.12 |
| Extraction (%) | 90.96 | 96.8 | 87.8 | 0.37 |

The embodiments of the invention in which an exclusive property or privilege is claimed are defined as follows:

1. A process for refining nickeliferrous ores containing large amounts of magnesia and silica and recovering iron, nickel and magnesium containing reduced amounts of silica which comprises the steps of
   (a) grinding the ore to reduce the particles size of the ore,
   (b) preparing a slurry of the ground ore in sulfuric acid containing less than ten percent of water,
   (c) adding water to the acid:ore slurry in an amout which is effective to initiate a sulfation reaction,
   (d) allowing the sulfation reaction to continue at a temperature of from about 150°–210° C for a period of from about 3 to about 10 minutes utilizing the heat of the sulfation reaction, whereby water-soluble metal sulfates are formed,
   (e) leaching the sulfation product with water to extract the water-soluble salts of iron, nickel and magnesium from the insoluble residue, and
   (f) recovering the nickel, magnesium and iron from the leach solution.

2. The process of claim 1 wherein the ore is ground to a particle size of minus 65 mesh and dried to a moisture content of less than 1% prior to formation of the slurry in step (b).

3. The process of claim 2 wherein the ore is dry-groud to a particle size range from minus 65 to minus 100 mesh and heated to reduce the moisture content of the ground ore to less than 0.5% by weight.

4. The process of claim 1 wherein the sulfuric acid contains less than 5% of water.

5. The process of claim 1 wherein the weight ratio of acid to ore is in the range of from about 1:1 to 1.1:1.

6. The process of claim 1 wherein the slurry prepared in step (b) is cooled during formation to prevent the sulfation reaction from beginning during the preparation step.

7. The process of claim 1 wherein the amount of water added in step (c) is sufficient to provide a total moisture content in the slurry of from about 3% to about 40% by weight based on the weight of the ore.

8. The method of claim 1 wherein 96% sulfuric acid is used in preparing the slurry in step (b).

9. The process of claim 1 wherein the water-soluble metal sulfates formed in step (d) are allowed to age before leaching in step (e).

* * * * *